(12) United States Patent
Marin et al.

(10) Patent No.: US 12,368,511 B2
(45) Date of Patent: Jul. 22, 2025

(54) EMBEDDED FARADAY ROTATORS AND COMPONENTS FOR INCREASING BANDWIDTH AND/OR REDUCING FIBER COUNT IN PHOTONICS MULTI CHIP PACKAGES

(71) Applicant: Intel Corporation, Santa Clara, CA (US)

(72) Inventors: Brandon C. Marin, Gilbert, AZ (US); Kaveh Hosseini, San Jose, CA (US); Conor O'Keeffe, Cork (IE); Hiroki Tanaka, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 17/119,844

(22) Filed: Dec. 11, 2020

(65) Prior Publication Data

US 2022/0190918 A1 Jun. 16, 2022

(51) Int. Cl.
*H04B 10/2581* (2013.01)
*G02B 27/28* (2006.01)
(Continued)

(52) U.S. Cl.
CPC ....... *H04B 10/2581* (2013.01); *G02B 27/283* (2013.01); *G02F 1/0142* (2021.01);
(Continued)

(58) Field of Classification Search
CPC ... H04B 10/2581; H04B 10/66; G02F 1/0142; G02F 1/09; G02B 27/283
(Continued)

(56) References Cited

U.S. PATENT DOCUMENTS 9,577,780 B2 * 2/2017 Welch .................. G02B 6/2786
11,022,756 B2 * 6/2021 Wang .................. G02B 6/2938
(Continued)

FOREIGN PATENT DOCUMENTS

CA 2357017 A1 * 7/2000
WO WO-2021030172 A2 * 2/2021 ............... G02F 1/21

OTHER PUBLICATIONS

Floess et al; Tunable and switchable polarization rotation with non-reciprocal plasmonic thin films at designated wavelengths ; 2015;Light: Science & Applications; pp. 1-7. (Year: 2015).*
(Continued)

*Primary Examiner* — Amritbir K Sandhu
(74) *Attorney, Agent, or Firm* — Schwabe, Williamson & Wyatt, P.C.

(57) ABSTRACT

Embodiments disclosed herein include photonics systems with a dual polarization module. In an embodiment, a photonics patch comprises a patch substrate, and a photonics die over a first surface of the patch substrate. In an embodiment, a multiplexer is over a second surface of the patch substrate. In an embodiment, a first optical path from the photonics die to the multiplexer is provided for propagating a first optical signal, and a second optical path from the photonics die to the multiplexer is provided for propagating a second optical signal. In an embodiment, a Faraday rotator is provided along the second optical path to convert the second optical signal from a first mode to a second mode before reaching the multiplexer.

11 Claims, 10 Drawing Sheets

(51) Int. Cl.
  *G02F 1/01*  (2006.01)
  *G02F 1/09*  (2006.01)
  *H04B 10/50*  (2013.01)
  *H04B 10/66*  (2013.01)

(52) U.S. Cl.
  CPC .............. *G02F 1/09* (2013.01); *H04B 10/50* (2013.01); *H04B 10/66* (2013.01)

(58) Field of Classification Search
  USPC .......................................................... 398/16
  See application file for complete search history.

(56) References Cited

U.S. PATENT DOCUMENTS

| | | | |
|---|---|---|---|
| 11,437,786 B2* | 9/2022 | Fish | G02B 27/286 |
| 2018/0180829 A1* | 6/2018 | Gudeman | H01S 5/18361 |
| 2019/0101773 A1* | 4/2019 | Stadler | G02F 1/093 |
| 2019/0335252 A1* | 10/2019 | Ryan | H04B 10/0793 |
| 2020/0119828 A1* | 4/2020 | Sahni | G02B 6/4213 |
| 2022/0187548 A1* | 6/2022 | Marin | G02B 6/4213 |

OTHER PUBLICATIONS

Jalas et al; Faraday rotation in silicon waveguides; 2017; Institute of Optical and Electronic Materials, Hamburg University of Technology, Eissendorfer Strasse; pp. 1-2. (Year: 2017).*

Wang et al; Linear and passive silicon optical isolator; Sep. 2012; Laboratory of Optical Physics, Institute of Physics, Chinese Academy of Sciences, pp. 1-6. (Year: 2012).*

\* cited by examiner

EMBEDDED FARADAY ROTATORS AND COMPONENTS FOR INCREASING BANDWIDTH AND/OR REDUCING FIBER COUNT IN PHOTONICS MULTI CHIP PACKAGES

GOVERNMENT LICENSE RIGHTS

This invention was made with Government support under Agreement No. HR0011-19-3-0003, awarded by DARPA. The Government has certain rights in the invention.

TECHNICAL FIELD

Embodiments of the present disclosure relate to electronic packages, and more particularly to photonics packages with a Faraday rotator for increasing bandwidth by propagating multiple transmission modes on a single optical fiber.

BACKGROUND

The microelectronic industry has begun using optical connections as a way to increase bandwidth and performance. Currently, fibers are optically coupled to a photonics die in the electronic package. The photonics dies currently available are configured to support a single polarization of the optical signals. For example, the photonics dies may operate using TE mode optical signals. As such, the optical fibers coupled to the photonics die only propagate the single polarization. Since multiple polarizations (e.g., TE mode and TM mode) are not provided on a single optical fiber, the bandwidth of the system is limited.

EMBODIMENTS OF THE PRESENT DISCLOSURE

Described herein are photonics packages with a Faraday rotator for increasing bandwidth by propagating multiple transmission modes on a single optical fiber, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, existing photonics systems are limited in bandwidth due to the ability to handle a single transmission mode. Accordingly, embodiments disclosed herein include a dual polarization module that is integrated into the photonics system and is optically coupled to the photonics die. The dual polarization module may comprise a splitter, a Faraday rotator, and a multiplexer. The splitter splits an incoming laser input into a first optical signal and a second optical signal. The second optical signal can pass through a Faraday rotator in order to switch the transmission mode (e.g., from TE to TM). The multiplexer then recombines the first optical signal and the second optical signal so the multiplexed signal can be propagated along a single optical fiber. This allows for a doubling of the bandwidth, or a reduction (by half) of the number of optical fibers needed for the system. Similarly, a receiver portion of the dual polarization module may demux an incoming multiplexed signal into a third optical signal and a fourth optical. A Faraday rotator can then convert the transmission mode of the fourth optical signal, so that both the third optical signal and the fourth optical signal have the same transmission mode.

Embodiments disclosed herein include various Faraday rotator architectures that may be used in the dual polarization module. In a first embodiment, a discrete Faraday rotator is mounted into a through hole in a patch substrate. In an additional embodiment, a Faraday rotator is integrated into the patch substrate during the fabrication of the patch substrate. In these two embodiments, the Faraday rotator is optically coupled to a bottom surface of the photonics die. In yet another embodiment, a Faraday rotator may be coupled to a top surface of the photonics die.

Figure 1A:
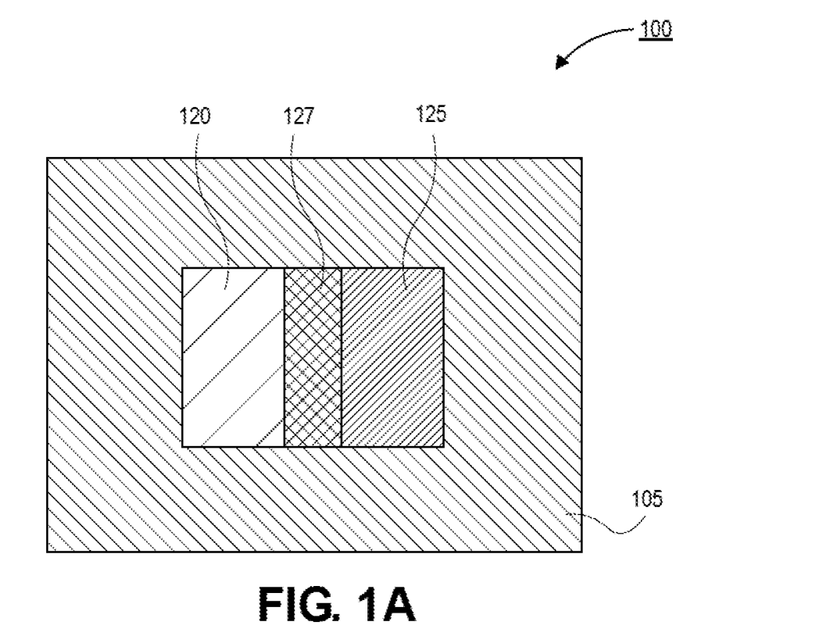
FIG. 1A is a plan view illustration of a photonics package, in accordance with an embodiment.

Referring now to FIG. 1A, a plan view illustration of a photonics system 100 is shown to provide context for embodiments described herein. As shown, the photonics system 100 comprises a package substrate 105. A compute die 120 and a photonics die 125 are provided on the package substrate 105. The compute die 120 is communicatively coupled to the photonics die 125 by a bridge 127 that is embedded in the package substrate 105. The photonics die 125 is typically configured to support a single transmission mode of optical signals. For example, the photonics die 125 may support TE mode signals or TM mode signals.

Figure 1B:
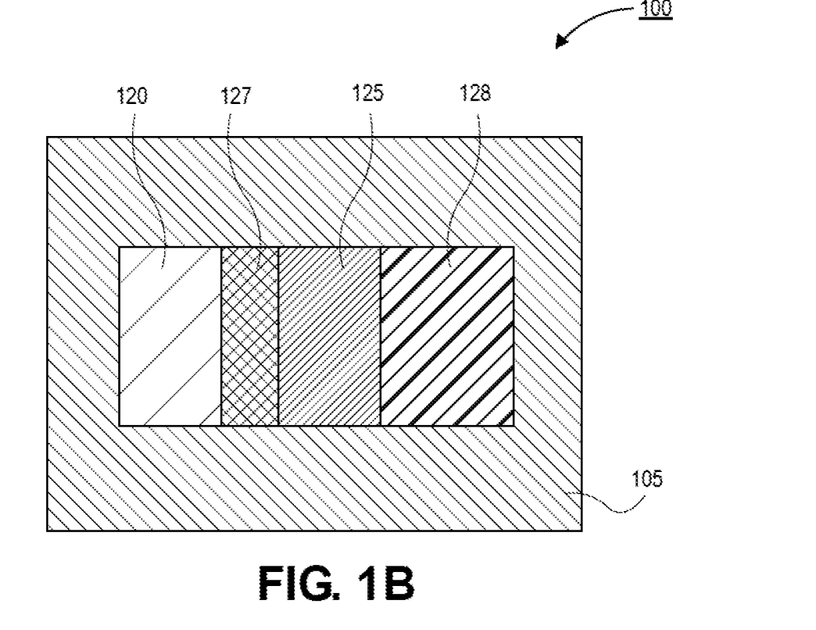
FIG. 1B is a plan view illustration of a photonics package with a dual polarization module that is coupled to the photonics die, in accordance with an embodiment.

In order to increase the bandwidth (or reduce optical fiber counts), embodiments disclosed herein include a dual polarization module. A photonics system 100 with a dual polarization module 128 is shown in FIG. 1B. As shown, the dual polarization module 128 is directly coupled to the photonics die 125. The dual polarization module 128 allows for the conversion of optical signals from a first transmission mode to a second transmission mode, or vice versa. That is, the conversion between transmission modes is implemented only on the dual polarization module 128. This allows photonics die 125 to remain agnostic to the changes in the transmission modes, as the photonics die 125 still only needs to handle one of the transmission modes.

Figure 2:
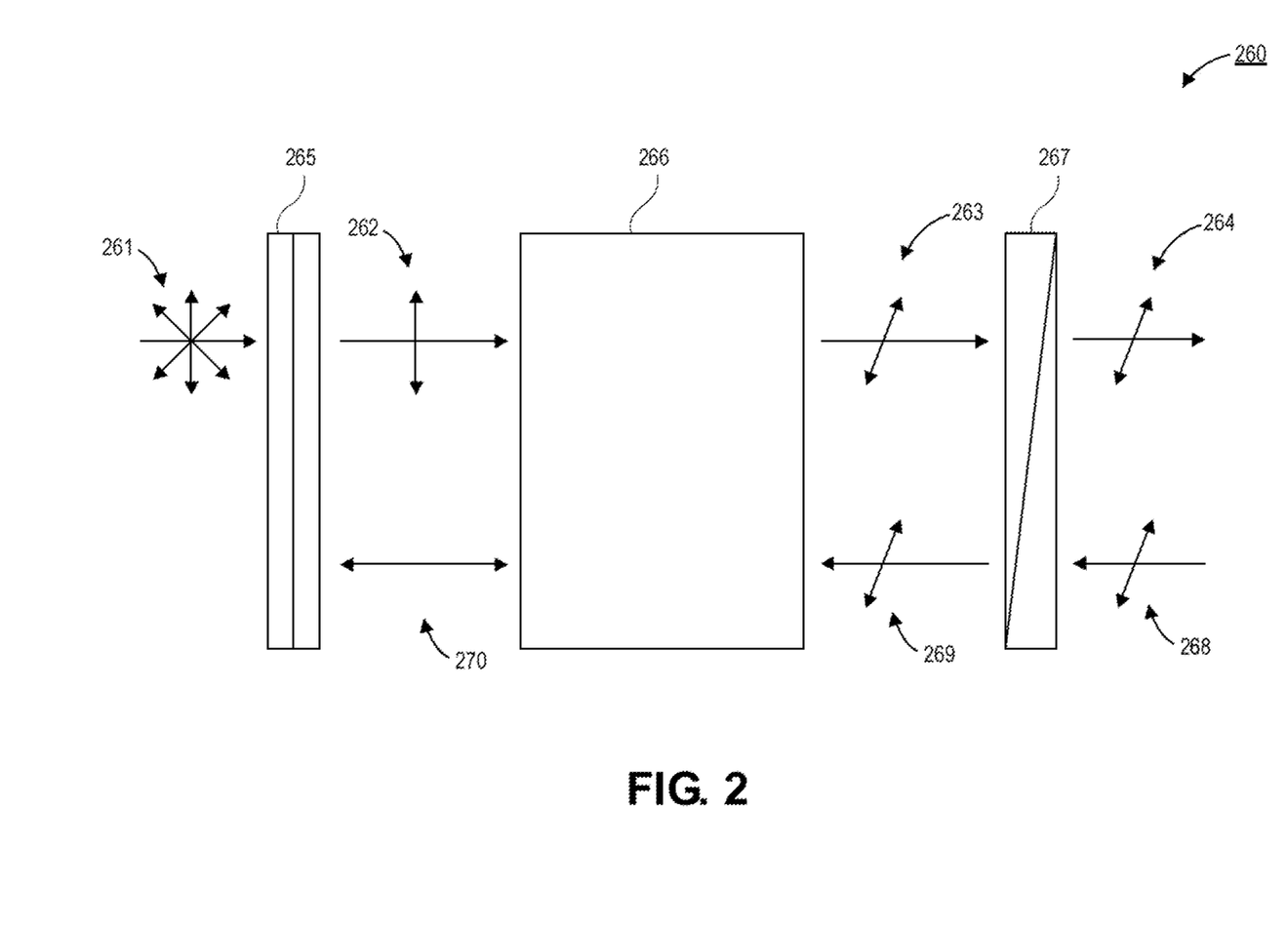
FIG. 2 is a schematic illustrating how a Faraday rotator functions, in accordance with an embodiment.

In an embodiment, the dual polarization module 128 comprises one or more Faraday rotators. The Faraday rotators comprise magnetic regions and polarizers that allow for conversion of the transmission mode. FIG. 2 provides a generic illustration of how Faraday rotators function. As shown, the Faraday rotator 260 comprises a first polarizer 265, a magnetic region 266, and a second polarizer 267 on the opposite side of the magnetic region 266 from the first polarizer 265. Incoming light 261 may have random polarization. After passing through the first polarizer 265, the light 262 may be vertically polarized. In an embodiment, the light 262 propagates through the magnetic region 266 where the magnetic field results in the polarization being shifted, as shown in light 263. For example, a 45° polarization shift may be provided in some embodiments. Light 263 then passes through the second polarizer 267, which restricts light to only the selected polarization shift induced by the magnetic region 266, as shown by light 264. In light passing the opposite direction (i.e., light 268, 269, and 270), the angled polarized light 268 and 269 passes back through the magnetic region 266. The magnetic region 266 again shifts the polarization. For example, when a 45° polarization is used, the polarization of the light 269 is further shifted so that light 270 is 90° polarized. It is to be appreciated that such a Faraday architecture may result in the filtering out of reflections from the optical path. As such, the signal-to-noise ratio is increased, and performance of the optical interconnects are improved in addition to providing a change in the transmission mode.

Referring now to FIGS. 3A-3D, exemplary Faraday rotators and their integration into photonics systems are shown, in accordance with various embodiments. While four different Faraday rotator architectures are shown, it is to be appreciated that dual polarization modules are not limited to the illustrated Faraday rotator architectures, and any structure that provides the functionality of a Faraday rotator may be used as part of the dual polarization modules.

Figure 3A:
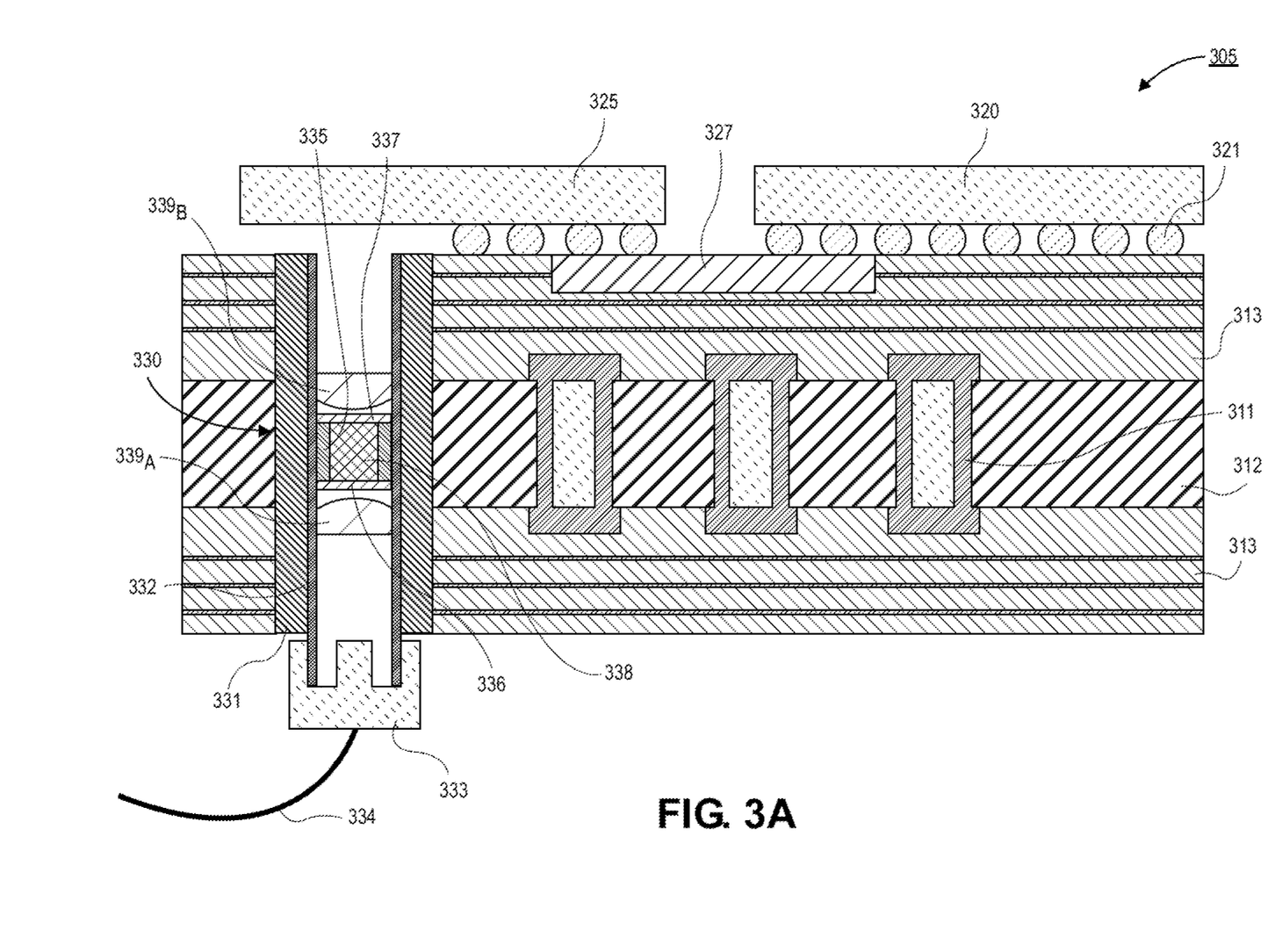
FIG. 3A is a cross-sectional illustration of a patch with an embedded Faraday rotator below the photonics die, in accordance with an embodiment.

Referring now to FIG. 3A, a cross-sectional illustration of a photonics patch 305 is shown, in accordance with an embodiment. In an embodiment, the patch 305 comprises a core 312 and conductive routing layers 313 above and below the core 312. Through core vias 311 may conductively couple the top routing layer 313 to the bottom routing layer 313. However, it is to be appreciated that in some embodiments, a coreless patch 305 may also be used.

In an embodiment, the patch 305 may comprise a compute die 320 and a photonics die 325. In an embodiment, the compute die 320 and the photonics die 325 are attached to the patch 305 by interconnects 321. Interconnects 321 may be any suitable first level interconnects (FLIs). The compute die 320 may be any type of die, such as, but not limited to a processor, a graphics processor, a field-programmable gate array (FPGA), a system on a chip (SoC), a memory, or the like. In an embodiment, the photonics die 325 comprises features for converting signals between the optical regime and the electrical regime. For example, the photonics die 325 may comprise a laser and/or a photodiode. In an embodiment, the compute die 320 is communicatively coupled to the photonics die 325 by a bridge 327 that is embedded in the top routing layer 313 of the patch 305. The bridge 327 provides a dimensionally stable substrate on which high density conductive routing can be provided.

In an embodiment, an optical cable 334 is connected to a connector 333. The connector 333 interfaces with a Faraday rotator 330 that passes through a thickness of the patch 305. In an embodiment, the Faraday rotator 330 is positioned within a footprint of the photonics die 325. As such, an optical path is provided through the Faraday rotator 330 from the connector 333 to the photonics die 325.

In an embodiment, the Faraday rotator 330 comprises a housing 332. The housing 332 may be a tube. In an embodiment, the housing 332 is mechanically coupled to the patch 305 by a dielectric layer 331. In an embodiment, the dielectric layer 331 is a material that expands during a heat treatment. As such, the Faraday rotator 330 can be inserted into the patch 305, and the heat treatment secures the Faraday rotator 330 to the patch 305.

In an embodiment, the Faraday rotator 330 may comprise a first polarizer 336 and a second polarizer 337. The first polarizer 336 may be a vertical polarizer and the second polarizer 337 may be an angled polarizer (e.g., 45°). That is, the first polarizer 336 may be different than the second polarizer 337. In an embodiment, a magnetic region is provided between the first polarizer 336 and the second polarizer 337. The magnetic region may comprise a permanent magnet 335. The permanent magnet 335 may be a shell that wraps around an optically clear layer 338. The permanent magnet 335 has a magnetic field that modifies the orientation of the incoming vertically polarized light. For example, the permanent magnet 335 may result in 45° polarized light in some embodiments.

In an embodiment, the efficiency of the Faraday rotator 330 may be further improved by including lenses. For example, a first lens 339A may be provided between the first polarizer 336 and the connector 333, and a second lens 339B may be provided between the second polarizer 337 and the photonics die 325.

In an embodiment, the Faraday rotator 330 is configured to convert an incoming optical signal from a first transmission mode to a second transmission mode. For example, incoming optical signals that are in a TE mode may be converted into optical signals in a TM mode. As will be described in greater detail below, the conversion between transmission modes allows for multiplexing or demuxing optical signals in order to improve bandwidth or reduce fiber counts.

Figure 3B:
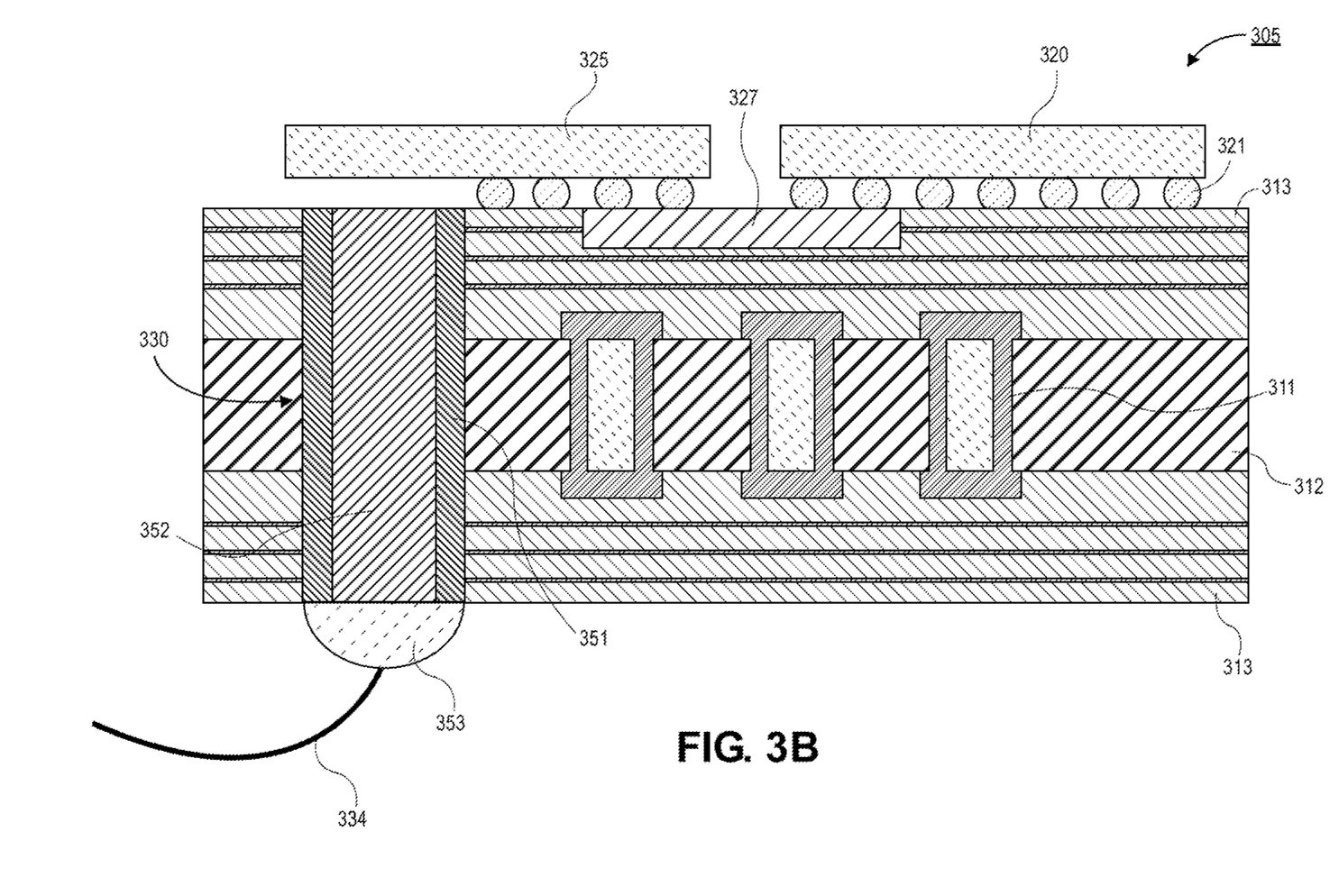
FIG. 3B is a cross-sectional illustration of a patch with an integrated Faraday rotator below the photonics die, in accordance with an embodiment.

Referring now to FIG. 3B, a cross-sectional illustration of a photonics patch 305 with an alternative Faraday rotator 330 architecture is shown, in accordance with an embodiment. In an embodiment, the patch 305 may comprise a core 312 with conductive routing layers 313 above and below the core 312. Through core vias 311 may electrically couple the top routing layers 313 to the bottom routing layers 313. In other embodiments, the patch 305 may be coreless. In an embodiment, a compute die 320 and a photonics die 325 are attached to the patch 305 by interconnects 321. Interconnects 321 may be any suitable FLIs. The compute die 320 may be communicatively coupled to the photonics die 325 by a bridge 327 embedded in the top routing layers 313.

In an embodiment, the patch 305 comprises a Faraday rotator 330. The Faraday rotator 330 may be integrated with the patch 305. That is, instead of being a discrete component (as is the case in FIG. 3A), the Faraday rotator 330 is assembled as part of the patch 305 during fabrication of the patch 305.

In an embodiment, the Faraday rotator 330 comprises a magnetic shell 351 and an optically clear core 352. The magnetic shell 351 may be in direct contact with the routing layers 313 and the core 312. That is, there may be no housing between the magnetic shell 351 and the substrate of the patch 305. However, in other embodiments, a liner (not shown) may separate the magnetic shell 351 from the substrate of the patch 305. In an embodiment, a lens 353 may be provided at a bottom of the Faraday rotator 330. The lens 353 may be coupled to an optical cable 334. While there are no polarizers shown in FIG. 3B, it is to be appreciated that embodiments may comprise a pair of polarizers provided on opposite ends of the magnetic shell 351. In other embodiments, the Faraday rotator 330 may be used without the polarizers.

In an embodiment, the Faraday rotator 330 is configured to convert an incoming optical signal from a first transmission mode to a second transmission mode. For example, incoming optical signals that are in a TE mode may be converted into optical signals in a TM mode. As will be described in greater detail below, the conversion between transmission modes allows for multiplexing or demuxing optical signals in order to improve bandwidth or reduce fiber counts.

Figure 3C:
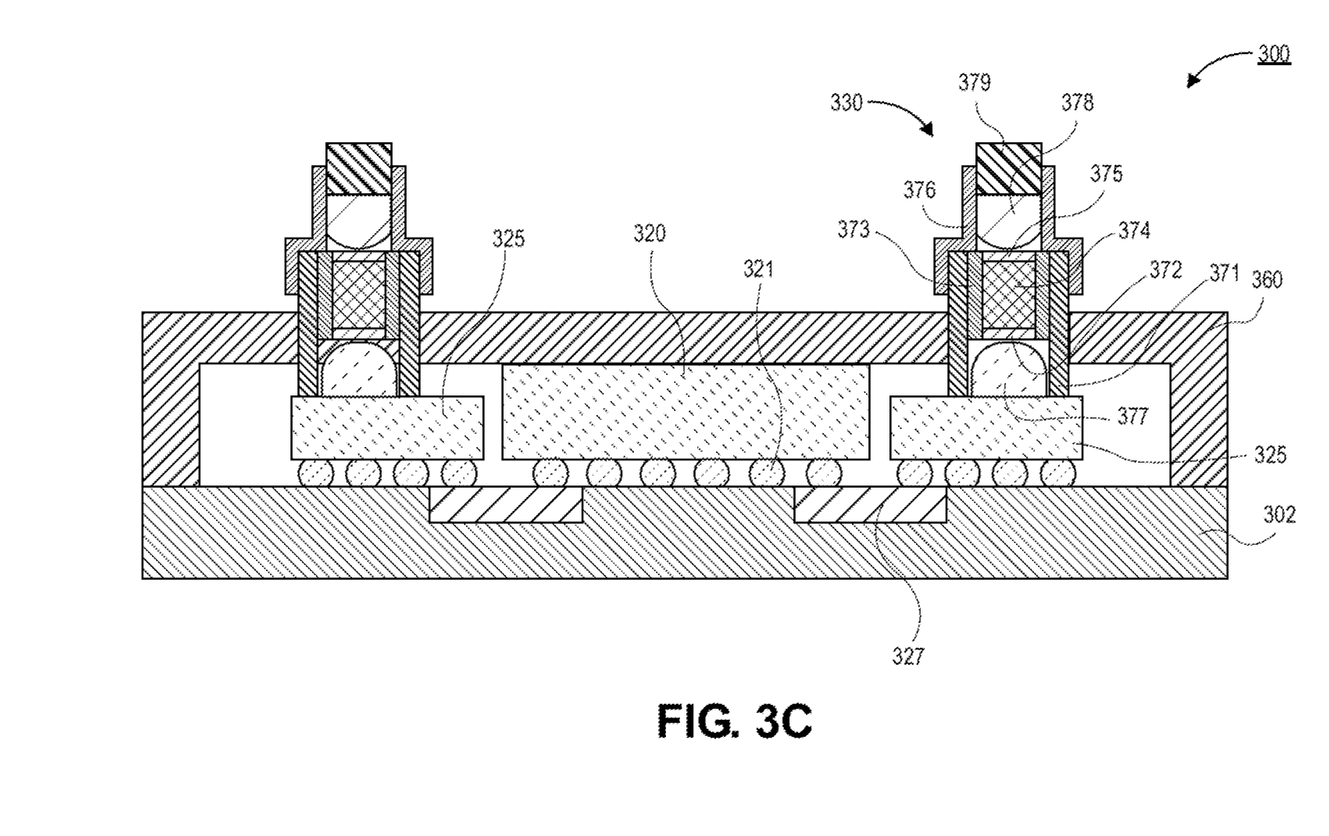
FIG. 3C is a cross-sectional illustration of an electronic package with a Faraday rotator optically coupled to a top surface of the photonics die, in accordance with an embodiment.

Referring now to FIG. 3C, a cross-sectional illustration of an electronic package 300 is shown, in accordance with an additional embodiment. In an embodiment, the electronic package 300 comprises a package substrate 302. In an embodiment, one or more embedded bridges 327 may be provided in the package substrate 302. The bridges 327 provide high density routing to communicatively couple photonics dies 325 to a compute die 320. The photonics dies 325 and the compute die 320 may be coupled to the package substrate 302 by interconnects 321. Interconnects 321 may comprise any FLI architecture. In an embodiment, an integrated heat spreader (IHS) 360 may be provided over the package substrate 302. The IHS 360 may be thermally coupled to the compute die 320. For example, a thermal interface material (TIM) (not shown) may be provided between the IHS 360 and the compute die 320.

In an embodiment, Faraday rotators 330 may pass through the IHS 360 and be optically coupled to the photonics dies 325. That is, the Faraday rotators 330 may be optically coupled to a top surface of the photonics dies 325. In an embodiment, the Faraday rotator 330 may comprise a tubular housing 371. A first polarizer 372 and a second polarizer 375 are provided in the housing 371. A magnetic shell 373 may be provided between the first polarizer 372 and the second polarizer 375. The magnetic shell 373 may be a permanent magnet in some embodiments. In the illustrated embodiment, the first polarizer 372 and the second polarizer 375 have a diameter that is substantially equal to an inner diameter of the magnetic shell 373. In such an embodiment, the first polarizer 372 and the second polarizer 375 may be positioned within the magnetic shell 373. However, in other embodiments, the first polarizer 372 and the second polarizer 375 may be on opposite ends of the magnetic shell 373 and be entirely outside the magnetic shell 373. In an embodiment, an optically clear plug 374 may be provided within an inner diameter of the magnetic shell 373.

The second polarizer 375 may be a vertical polarizer and the first polarizer 372 may be an angled polarizer (e.g., 45°). That is, the first polarizer 372 may be different than the second polarizer 375. In an embodiment, the magnetic shell 373 has a magnetic field that modifies the orientation of the incoming vertically polarized light. For example, the magnetic shell 373 may result in 45° polarized light in some embodiments.

In an embodiment, a first lens 377 may be provided within the housing 371. The lens 377 improves optical coupling between the Faraday rotator 330 and the photonics die 325. In an embodiment, a connector 376 is provided over and around an end of the housing 371. The connector 376 may be tubular and surround an end of the housing 371. The connector 376 may comprise a second lens 378 to focus optical signals coming into the Faraday rotator 330. The connector 376 may provide mechanical coupling of an optical fiber 379 to the Faraday rotator 330.

In an embodiment, the Faraday rotator 330 is configured to convert an incoming optical signal from a first transmission mode to a second transmission mode. For example, incoming optical signals that are in a TE mode may be converted into optical signals in a TM mode. As will be described in greater detail below, the conversion between transmission modes allows for multiplexing or demuxing optical signals in order to improve bandwidth or reduce fiber counts.

Figure 3D:
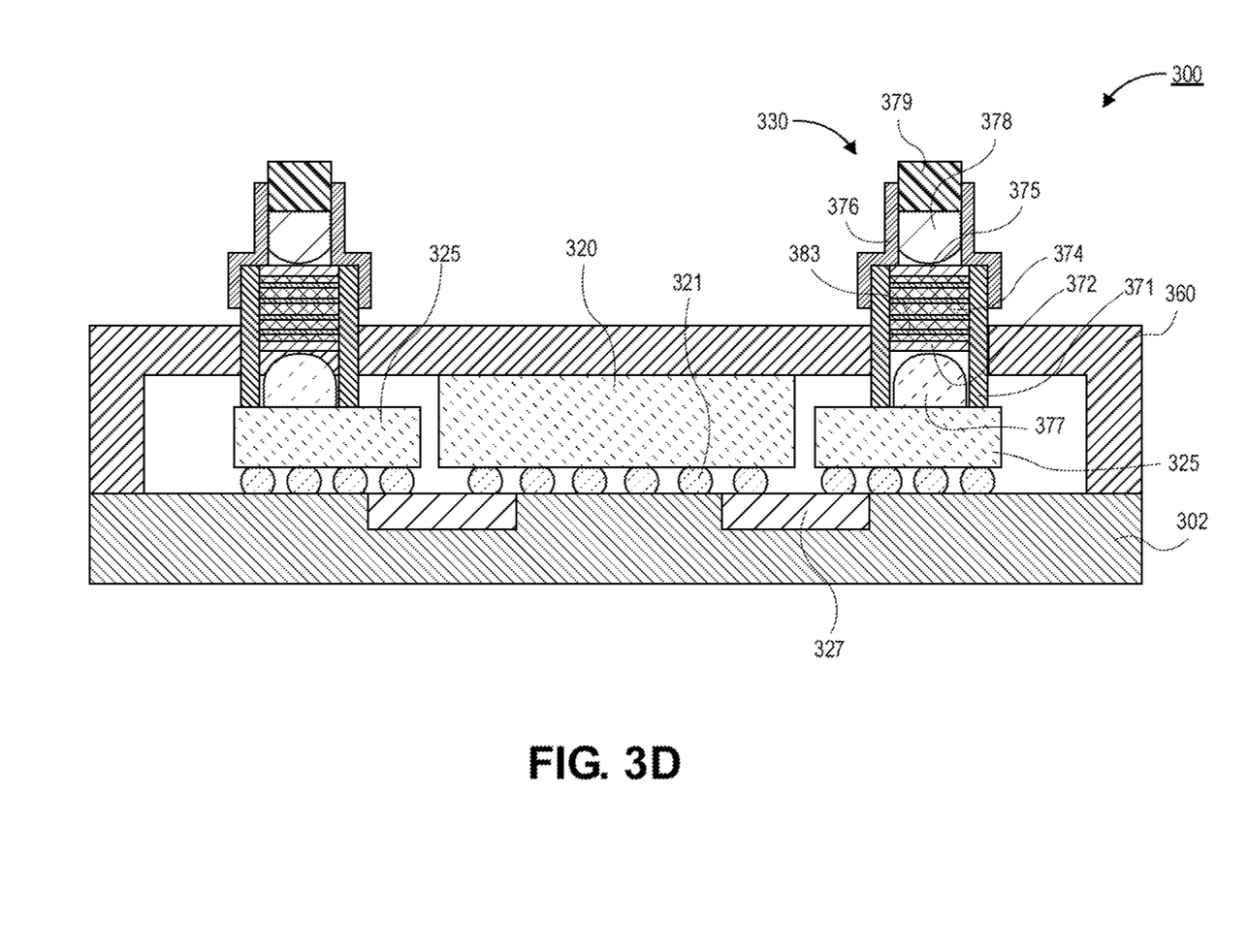
FIG. 3D is a cross-sectional illustration of an electronic package with a Faraday rotator with an electromagnetic magnetic region optically coupled to a top surface of the photonics die, in accordance with an embodiment.

Referring now to FIG. 3D, a cross-sectional illustration of an electronic package 300 is shown, in accordance with an additional embodiment. In an embodiment, the electronic package 300 in FIG. 3D is substantially similar to the electronic package 300 in FIG. 3C, with the exception of there being a different magnet configuration in the Faraday rotator 330. Instead of providing a permanent magnet shell, a conductive coil 383 is provided between the first polarizer 372 and the second polarizer 375. The conductive coil 383 may be an electromagnet that is connected to a power source (not shown). Controlling the current that passes through the conductive coil 383 allows for a controllable magnetic field to be provided around the plug 374. As such, the incoming optical signal can have a tunable light polarization.

In an embodiment, the Faraday rotator 330 is configured to convert an incoming optical signal from a first transmission mode to a second transmission mode. For example, incoming optical signals that are in a TE mode may be converted into optical signals in a TM mode. As will be described in greater detail below, the conversion between transmission modes allows for multiplexing or demuxing optical signals in order to improve bandwidth or reduce fiber counts.

Figure 4:
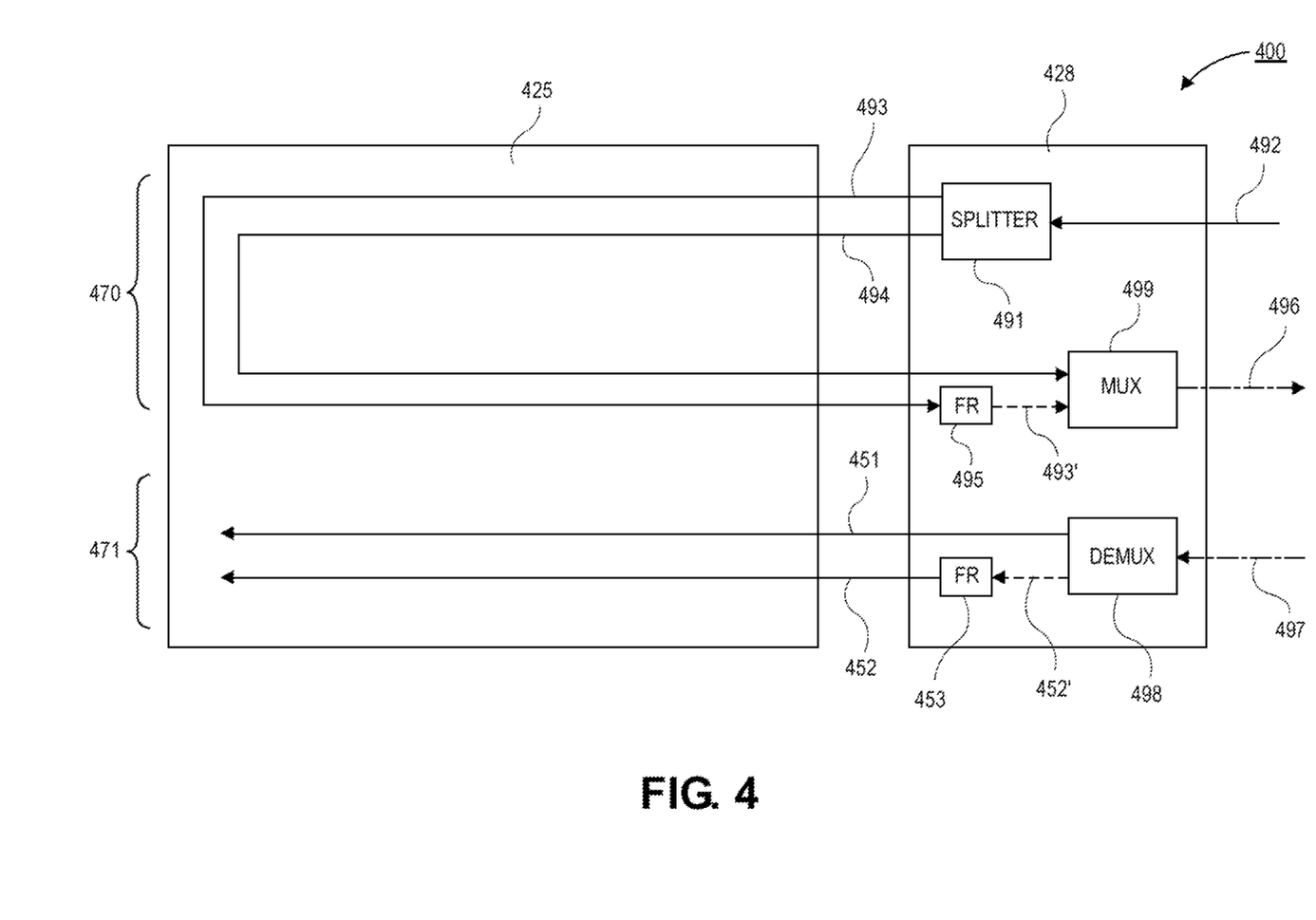
FIG. 4 is a schematic illustration depicting how the dual polarization module allows for muxing and demuxing optical signals to allow for dual polarization over a single optical fiber, in accordance with an embodiment.

Referring now to FIG. 4, a schematic illustration of a system 400 that shows how the dual polarization module 428 interfaces with the photonics die 425 is shown, in accordance with an embodiment. In an embodiment, the system has a transmit (Tx) chain 470 and a receive (Rx) chain 471. The Tx chain 470 outputs a multiplexed signal 496 that comprises both a TM mode signal and a TE mode signal. The Rx chain 471 receives a multiplexed signal 497 and converts it to a pair of TE mode signals 451 and 452.

With respect to the Tx chain 470, input laser light 492 is provided to a splitter 491 on the dual polarization module 428. The splitter 491 splits the input laser light 492 into a first optical signal 494 and a second optical signal 493. In an embodiment, the first optical signal 494 and the second optical signal 493 are propagated with a first transmission mode (e.g., TE mode). The first optical signal 494 and the second optical signal 493 are propagated to the photonics die 425. The photonics die 425 modulates the first optical signal 494 and the second optical signal 493 to put data on the optical signals.

In an embodiment, the first optical signal 494 and the second optical signal 493 are returned to the dual polarization module 428. In an embodiment, the second optical signal 493 passes through a Faraday rotator (FR) 495. The second optical signal 493 is converted to a second transmission mode (e.g., TM mode) by the Faraday rotator 495 to provide a modified second optical signal 493'. In an embodiment, the first optical signal 494 and the modified second optical signal 493' are provided to a multiplexer (MUX) 499, which combines the signals into a multiplexed signal 496 with both TE and TM transmission modes.

In this way, a single fiber cable can propagate two signals, and bandwidth over the optical fiber is doubled. Additionally, it is to be appreciated that the photonics die 425 only needs to accommodate a single transmission mode. For example, only TE mode signals are provided to the photonics die 425 on the Tx chain 470. As such, the photonics die 425 may be substantially agnostic to the polarization changes provided by the dual polarization module 428.

With respect to the Rx chain 471, a multiplexed signal 497 may be received by a demuxer (DEMUX) 498. The multiplexed signal 497 may comprise a third signal 451 with a first transmission mode and a fourth signal 452' with a second transmission mode. For example, the first transmission mode may be TE and the second transmission mode may be TM. The demuxer 498 separates the third signal 451 from the fourth signal 452'. The third signal 451 is propagated directly to the photonics die 425, and the fourth signal 452' passes through a Faraday rotator 453. The Faraday rotator changes the transmission mode from the second transmission mode to the first transmission mode. For example, the Faraday rotator 453 may change the transmission mode of the fourth signal 452' from a TM mode to a TE mode. The modified fourth signal 452 is then propagated to the photonics die 425.

In this way, a multiplexed signal with two transmission modes can be received and processed by a photonics die that is configured to handle only a single transmission mode, and bandwidth over the optical fiber is doubled. Additionally, it is to be appreciated that the photonics die 425 only needs to accommodate a single transmission mode. For example, only TE mode signals are provided to the photonics die 425 on the Rx chain 471. As such, the photonics die 425 may be substantially agnostic to the polarization changes provided by the dual polarization module 428.

Figure 5:
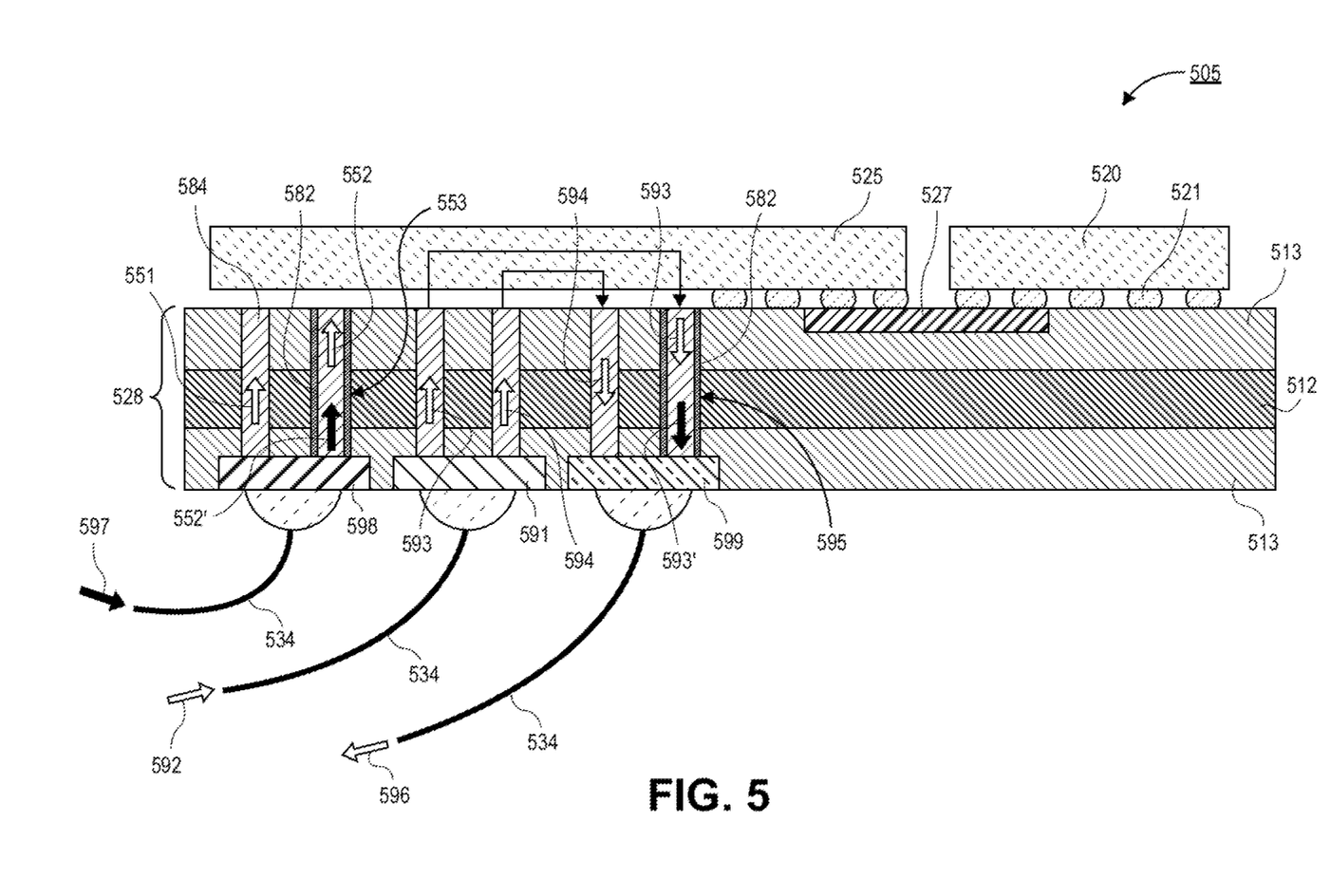
FIG. 5 is a cross-sectional illustration of a photonics patch with an integrated dual polarization module, in accordance with an embodiment.

Referring now to FIG. 5, a cross-sectional illustration of a photonics patch 505 with an integrated dual polarization module 528 is shown, in accordance with an embodiment. In an embodiment, the patch 505 may comprise a core 512 with routing layers 513 above and below the core 512. A photonics die 525 and a compute die 520 may be coupled to the routing layers 513 by FLIs 521. A bridge 527 may communicatively couple the photonics die 525 to the compute die 520.

In an embodiment, the dual polarization module 528 is integrated in the core 512 and routing layers 513 below the photonics die 525. Starting with the Tx chain, an input laser source 592 is provided along an optical fiber 534 towards a splitter 591. The splitter 591 may be embedded in the bottom routing layer 513 or provided over the bottom routing layer 513. The splitter 591 may be mounted with standard mounting processes. The splitter 591 splits the incoming laser source 592 into a first optical signal 594 and a second optical signal 593. In an embodiment, the first optical signal 594 and the second optical signal 593 may be TE mode signals. The first optical signal 594 and the second optical signal 593 are propagated to the photonics die 525 through optical paths 584.

After passing through the photonics die 525 the first optical signal 594 propagates down an optical path 584 to a multiplexer 599. The second optical signal 593 passes through a Faraday rotator 595 and is converted from the first mode to a second mode (e.g., TM mode). The modified second optical signal 593' is then provided to the multiplexer 599. The multiplexer 599 may be embedded in the bottom routing layers 513 or provided over the bottom routing layers 513. The multiplexer may be mounted with standard mounting processes. The multiplexer 599 combines the first optical signal 594 with the modified second optical signal 593' to provide a multiplexed signal 596 that is propagated along the fiber 534. In an embodiment, the fiber 534 may be a single mode fiber or a multi-mode fiber. It is to be appreciated that, with respect to the fiber 534, the mode is different than the TE or TM mode. That is, a single mode fiber 534 may still be able to propagate a multiplexed signal 596 with both TE and TM mode optical signals.

Referring now to the Rx chain, an incoming multiplexed signal 597 is provided to a demuxer 598 over a fiber 534. The demuxer 598 splits the multiplexed signal 597 into a third optical signal 551 and a fourth optical signal 552'. The demuxer 598 may be provided in the bottom routing layers 513 or over the bottom routing layers 513. The demuxer 598 may be mounted with standard processes.

The third optical signal 551 may be a first mode (e.g., TE) and the fourth optical signal 552' may be a second mode (e.g., TM). The third optical signal 551 is provided to the photonics die 525 through an optical path 584. The fourth optical signal 552' is propagated through a Faraday rotator 553. The Faraday rotator 553 converts the second mode to the first mode, to provide a modified fourth signal 552. For example, the modified fourth signal 552 may be TE mode.

In the illustrated embodiment, the Faraday rotators 595 and 553 are formed with structures similar to the structure of FIG. 3B. That is, a magnetic shell 582 surrounds the optical path 584. While discrete polarizers are not shown, it is to be appreciated that the Faraday rotators 595 and 553 may also comprise polarizers above and below the magnetic shells 582 in some embodiments. Additionally, it is to be appreciated that other Faraday rotator architectures, such as, but not limited to, architectures shown in FIG. 3A, FIG. 3C, and FIG. 3D, may be utilized in the dual polarization module 528, in accordance with additional embodiments.

Figure 6:
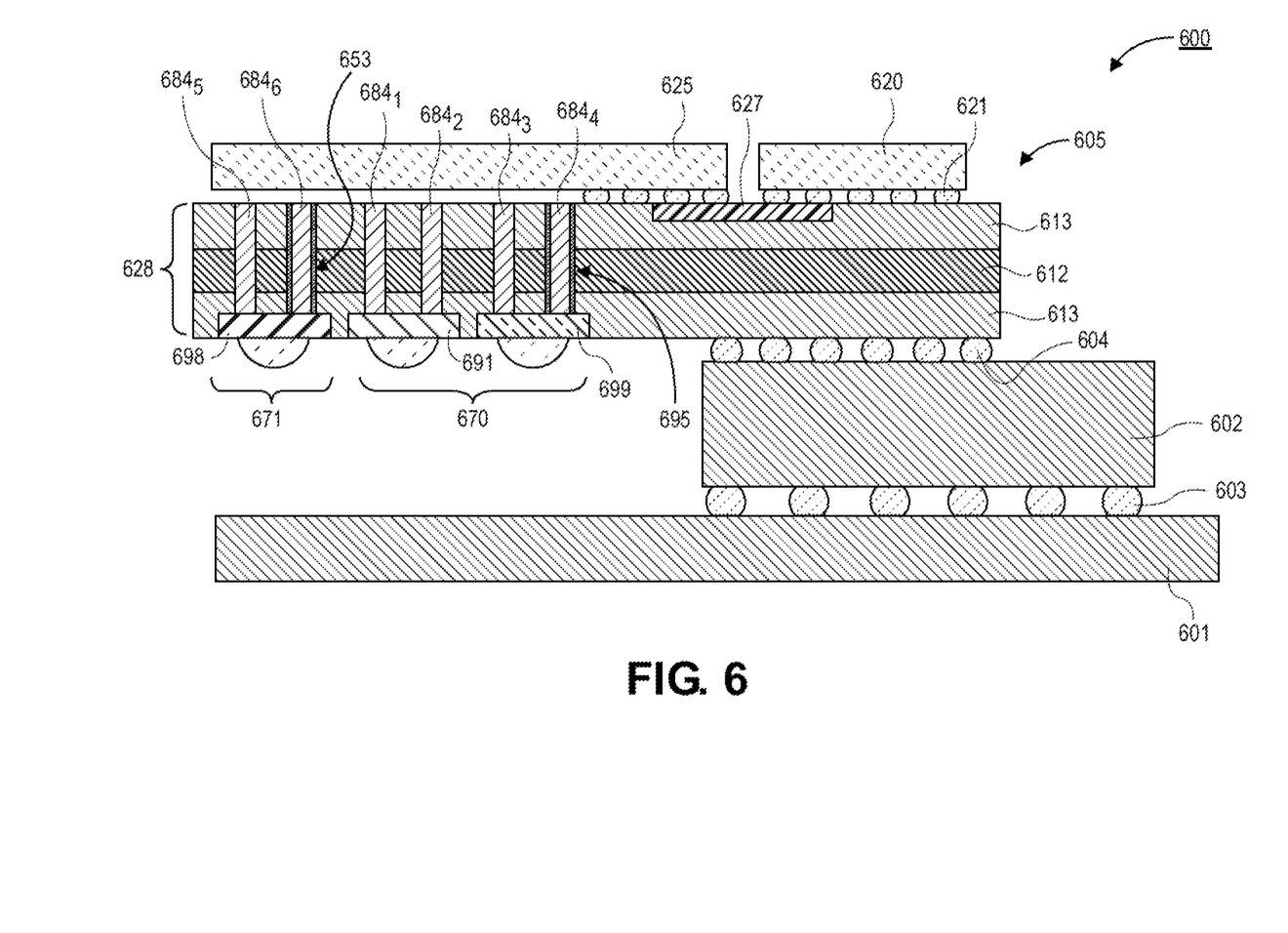
FIG. 6 is a cross-sectional illustration of an electronic system with an integrated dual polarization module, in accordance with an embodiment.

Referring now to FIG. 6, a cross-sectional illustration of an electronic system 600 is shown, in accordance with an embodiment. In an embodiment, the electronic system 600 comprises a board 601, such as a printed circuit board (PCB). An interposer 602 is attached to the board 601 by interconnects 603. While shown as solder balls, it is to be appreciated that interconnects 603 may be any architecture, such as sockets or the like. The interposer 602 may comprise conductive routing (not shown) to provide electrical coupling between a top surface of the interposer 602 and a bottom surface of the interposer 602.

In an embodiment, a patch 605 is attached to the interposer 602 by interconnects 604, such as solder bumps. The patch 605 may be substantially similar to any of the patches described herein. For example, the patch 605 comprises a core 612 with conductive routing layers 613 above and below the core 612. A compute die 620 may be communicatively coupled to a photonics die 625 by a bridge 627. FLIs 621 may couple the compute die 620 and the photonics die 625 to the routing layers 613.

In an embodiment, the patch 605 may comprise an integrated dual polarization module 628. For example, the dual polarization module 628 may be provided through the core 612 and the routing layers 613. The dual polarization module 628 may comprise a Tx chain 670 and an Rx chain 671. The Tx chain 670 may comprise a splitter 691, and a first optical path $684_1$ and a second optical path $684_2$ between the splitter 691 and the photonics die 625. Return optical paths $684_3$ and $684_4$ may be provided between the photonics die 625 and a multiplexer 699. In an embodiment, the fourth optical path $684_4$ passes through a Faraday rotator 695. The Faraday rotator 695 may convert a TE mode signal to a TM mode signal. The multiplexer 699 combines the TE mode signal from the third optical path $684_3$ with the TM mode signal from the fourth optical path $684_4$.

On the Rx chain 671, a demuxer 698 feeds a fifth optical path $684_5$ and a sixth optical path $684_6$. The demuxer 698 may separate a TE mode signal from a TM mode signal. The TE mode signal passes through the fifth optical path $684_5$ to the photonics die 625, and the TM mode signal is converted to a TE mode signal by a Faraday rotator 653 along the sixth optical path $684_6$.

As shown in FIG. 6, the patch 605 may overhang an edge of the interposer 602. The overhanging portion of the patch 605 allows for access to the bottom surface of the patch where fibers (not shown in FIG. 6) can connect to the dual polarization module 628.

Figure 7:
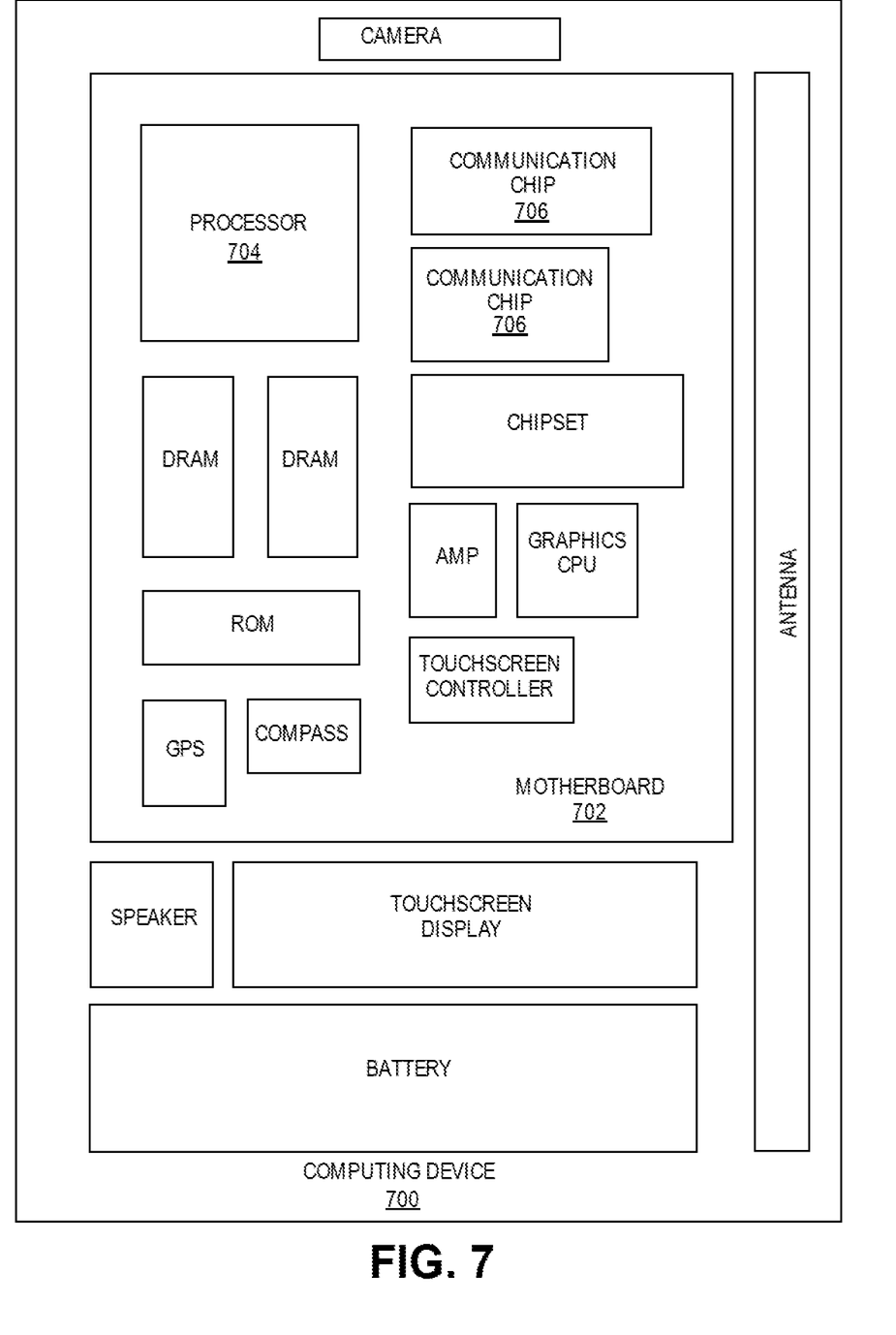
FIG. 7 is a schematic of a computing device built in accordance with an embodiment.

FIG. 7 illustrates a computing device 700 in accordance with one implementation of the invention. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. In some implementations of the invention, the integrated circuit die of the processor may be part of an electronic system with a photonics die that is optically coupled to a dual polarization module, in accordance with embodiments described herein. The term "processor" may refer to any device or portion of a device that processes electronic data from registers and/or memory to transform that electronic data into other electronic data that may be stored in registers and/or memory.

The communication chip 706 also includes an integrated circuit die packaged within the communication chip 706. In accordance with another implementation of the invention, the integrated circuit die of the communication chip may be part of an electronic system with a photonics die that is optically coupled to a dual polarization module, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: a photonics device, comprising: a substrate; a photonics die over a first surface of the substrate; a multiplexer over a second surface of the substrate; a first optical path from the photonics die to the multiplexer for propagating a first optical signal; and a second optical path from the photonics die to the multiplexer for propagating a second optical signal, wherein a magnetic shell and an optically clear plug filling the magnetic shell is provided along the second optical path to convert the second optical signal from a first mode to a second mode before reaching the multiplexer.

Example 2: the photonics device of Example 1, wherein the first mode is a TE mode, and wherein the second mode is a TM mode.

Example 3: the photonics device of Example 2, wherein the first optical signal is a TE mode signal.

Example 4: the photonics device of Examples 1-3, wherein the multiplexer combines the first optical signal with the second optical signal to form a multiplexed signal.

Example 5: the photonics device of Example 4, wherein the multiplexed signal is propagated along a single optical fiber.

Example 6: the photonics device of Examples 1-5, further comprising: a splitter, wherein the splitter is configured to split an incoming optical signal into the first optical signal and the second optical signal.

Example 7: the photonics device of Example 6, wherein the splitter is on the same surface of the substrate as the multiplexer.

Example 8: the photonics device of Example 6, wherein an input laser provides the incoming optical signal to the splitter, and wherein the incoming optical signal is a TE mode signal.

Example 9: the photonics device of Examples 1-8, wherein the magnetic shell and the optically clear plug function as a Faraday rotator.

Example 10: the photonics device of Examples 1-9, wherein the Faraday rotator further comprises: a tube wherein the magnetic shell is within the tube; a first polarizer; a second polarizer, wherein the first polarizer and the second polarizer are on opposite ends of the magnetic shell.

Example 11: the photonics device of Examples 1-10, further comprising: a compute die over the substrate, wherein the compute die is communicatively coupled to the photonics die by an embedded bridge.

Example 12: a photonics patch, comprising: a patch substrate; a photonics die over the patch substrate; a compute die over the patch substrate and communicatively coupled to the photonics die by a bridge embedded in the patch substrate; a splitter below the photonics die, wherein the splitter is configured to split an incoming optical signal into a first optical signal and a second optical signal; a first optical path from the splitter to the photonics die for propagating the first optical signal; a second optical path from the splitter to the photonics die for propagating the second optical signal; a third optical path from the photonics die to a multiplexer for propagating the first optical signal; and a fourth optical path from the photonics die to the multiplexer for propagating the second optical signal, wherein a Faraday rotator is provided along the fourth optical path to convert the second optical signal from a first mode to a second mode.

Example 13: the photonics patch of Example 12, wherein the first mode is a TE mode, and wherein the second mode is a TM mode.

Example 14: the photonics patch of Example 13, wherein the first optical signal is a TE mode signal.

Example 15: the photonics patch of Examples 12-14, wherein the multiplexer combines the first optical signal with the second optical signal to form a multiplexed signal.

Example 16: the photonics patch of Example 15, wherein the multiplexed signal is propagated along a single optical fiber.

Example 17: the photonics patch of Examples 12-16, further comprising: a receive channel, wherein the receive channel comprises: a demuxer, wherein the demuxer is configured to split an incoming multiplexed signal comprising a third optical signal and a fourth optical signal, wherein the third optical signal is the first mode and the fourth optical signal is the second mode; a fifth optical path between the demuxer and the photonics die, wherein the third optical signal is propagated along the fifth optical path; and a sixth optical path between the demuxer and the photonics die, wherein the fourth optical signal is propagated along the sixth optical path, and wherein a second Faraday rotator is provided along the sixth optical path to convert the fourth optical signal from the second mode to the first mode.

Example 18: the photonics patch of Examples 12-17, wherein the Faraday rotator comprises: a magnetic shell; and an optically clear plug filling the magnetic shell.

Example 19: the photonics patch of Examples 12-17, wherein the Faraday rotator comprises: a tube; a first polarizer; a second polarizer; and a magnetic shell between the first polarizer and the second polarizer.

Example 20: a photonics patch, comprising: a patch substrate; a photonics die over the patch substrate; a transmit chain, wherein the transmit chain is configured to split an incoming optical signal into a first optical signal and a second optical signal, and wherein the second optical signal is converted from a first mode to a second mode by a first Faraday rotator; and a receive chain, wherein the receive chain is configured to split a multiplexed signal into a third optical signal propagating at the first mode and a fourth optical signal propagating at the second mode, and wherein a second Faraday rotator converts the fourth optical signal to the first mode before reaching the photonics die.

Example 21: the photonics patch of Example 20, wherein the photonics die only receives and/or transmits optical signals propagating with the first mode.

Example 22: the photonics patch of Example 20 or Example 21, wherein the first mode is a TE mode and the second mode is a TM mode.

Example 23: an electronic system, comprising: a board; an interposer over the board; and a patch over the interposer, wherein the patch comprises: a patch substrate; a photonics die; a transmit chain, wherein the transmit chain comprises: a splitter to split an incoming optical signal into a first optical signal and a second optical signal; a Faraday rotator to convert the second optical signal from a first mode to a second mode; and a multiplexer to combine the first optical signal with the second optical signal to propagate along a single optical fiber.

Example 24: the electronic system of Example 23, wherein the patch substrate overhangs an edge of the interposer.

Example 25: the electronic system of Example 23 or Example 24, wherein the patch further comprises: a receive chain, wherein the receive chain is configured to split a multiplexed signal into a third optical signal propagating at the first mode and a fourth optical signal propagating at the second mode, and wherein a second Faraday rotator converts the fourth optical signal to the first mode before reaching the photonics die.

What is claimed is:

1. A photonics device, comprising:
 a package substrate, the package substrate comprising a plurality of conductive routing layers;
 a photonics die over a first surface of the package substrate;
 a multiplexer over a second surface of the package substrate;
 a first optical path from the photonics die to the multiplexer for propagating a first optical signal; and
 a second optical path from the photonics die to the multiplexer for propagating a second optical signal, wherein a magnetic shell and an optically clear plug filling the magnetic shell is provided along the second optical path to convert the second optical signal from a first mode to a second mode before reaching the multiplexer, wherein the magnetic shell and the optically clear plug are within an opening in the package substrate, the optically clear plug extending from a top of the package substrate to the multiplexer.

2. The photonics device of claim 1, wherein the first mode is a transverse electric (TE) mode, and wherein the second mode is a transverse magnetic TM mode.

3. The photonics device of claim 2, wherein the first optical signal is a TE mode signal.

4. The photonics device of claim 1, wherein the multiplexer combines the first optical signal with the second optical signal to form a multiplexed signal.

5. The photonics device of claim 4, wherein the multiplexed signal is propagated along a single optical fiber.

6. The photonics device of claim 1, further comprising:
a splitter, wherein the splitter is configured to split an incoming optical signal into the first optical signal and the second optical signal.

7. The photonics device of claim 6, wherein the splitter is on the same surface of the package substrate as the multiplexer.

8. The photonics device of claim 6, wherein an input laser provides the incoming optical signal to the splitter, and wherein the incoming optical signal is a TE mode signal.

9. The photonics device of claim 1, wherein the magnetic shell and the optically clear plug function as a Faraday rotator.

10. The photonics device of claim 9, wherein the Faraday rotator further comprises:
a tube wherein the magnetic shell is within the tube;
a first polarizer;
a second polarizer wherein the first polarizer and the second polarizer are on opposite ends of the magnetic shell.

11. The photonics device of claim 1, further comprising:
a compute die over the package substrate, wherein the compute die is communicatively coupled to the photonics die by an embedded bridge.

* * * * *